United States Patent [19]

Stephens et al.

[11] Patent Number: 5,166,591
[45] Date of Patent: Nov. 24, 1992

[54] CURRENT CHOPPING STRATEGY FOR GENERATING ACTION IN SWITCHED RELUCTANCE MACHINES

[75] Inventors: Charles M. Stephens, Pattersonville; Arthur V. Radun, Ballston Lake, both of N.Y.

[73] Assignee: General Electric Company, Schenectady, N.Y.

[21] Appl. No.: 801,327

[22] Filed: Dec. 2, 1991

[51] Int. Cl.⁵ .............................................. H02P 7/36
[52] U.S. Cl. ................................................... 318/701
[58] Field of Search ............... 318/138, 254, 439, 685, 318/696, 701; 363/95, 97, 98

[56] References Cited

U.S. PATENT DOCUMENTS

| | | | |
|---|---|---|---|
| 4,137,491 | 1/1979 | Bartley et al. | 318/685 |
| 4,684,867 | 8/1987 | Miller et al. | 318/701 |
| 4,739,240 | 4/1988 | MacMinn et al. | 318/696 |
| 4,896,089 | 1/1990 | Kliman et al. | 318/701 |
| 4,933,621 | 6/1990 | MacMinn et al. | 318/696 |

Primary Examiner—Bentsu Ro
Attorney, Agent, or Firm—Jill M. Breedlove; Marvin Snyder

[57] ABSTRACT

A method and apparatus are provided for controlling the switching devices in a switched reluctance machine bridge inverter, which inverter has at least two switching devices per phase leg, during generating operation. At the start of the conduction interval for a particular machine phase, both switching devices of that phase are turned on, causing the phase current to build up. When the phase current reaches an upper hysteresis band level, both switching devices are turned off, resulting in the application of a reverse voltage across the phase winding and directing the phase current into the power source via flyback diodes. At relatively low and medium speeds, the phase current decreases until it reaches a lower hysteresis band level, at which point only one switching device is turned back on to form a freewheeling loop through that device and the corresponding flyback diode. The process repeats until the turn-off angle of the active phase is reached, at which point both switches are turned off in order to discharge the corresponding phase winding.

8 Claims, 5 Drawing Sheets

CURRENT CHOPPING STRATEGY FOR GENERATING ACTION IN SWITCHED RELUCTANCE MACHINES

FIELD OF THE INVENTION

The present invention relates generally to switching control and current regulation in bridge inverters. More particularly, the present invention relates to a method and apparatus for controlling the switching devices and regulating current in a switched reluctance machine employed as a generator.

BACKGROUND OF THE INVENTION

A switched reluctance machine (SRM) is a brushless, synchronous machine having salient rotor and stator poles. There is a concentrated winding on each of the stator poles, but no windings or permanent magnets on the rotor. Each pair of diametrically opposite stator pole windings is connected in series or in parallel to form an independent machine phase winding of the multiphase SRM. Ideally, the flux entering the rotor from one stator pole balances the flux leaving the rotor from the diametrically opposite stator pole, so that there is no mutual magnetic coupling among the phases.

Torque is produced by switching current in each phase winding in a predetermined sequence that is synchronized with angular position of the rotor. In this way, a magnetic force of attraction results between the rotor poles and stator poles that are approaching each other. The current is switched off in each phase before the rotor poles nearest the stator poles of that phase rotate past the aligned position; otherwise, the magnetic force of attraction would produce a negative, or braking, torque. In a SRM, torque direction is independent of current direction. Therefore, in contrast to most other brushless machines which require bidirectional phase currents, a SRM power inverter can be configured to enable current flow in only one direction through a phase winding. Such an inverter generally employs one or more switching devices, such as transistors or thyristors, in series with each machine phase winding. Advantageously, the switching devices prevent "shoot-through" current paths. Exemplary SRM converters are illustrated in commonly assigned U.S. Pat. No. 4,684,867, issued to T. J. E. Miller on Aug. 4, 1987, which is hereby incorporated by reference.

At relatively low and medium speeds, current magnitude regulation in SRMs is typically achieved by hysteresis band current chopping In a SRM drive employing two switching devices per phase, such a current chopping scheme involves generating a commanded reference current waveform which has predetermined upper and lower hysteresis band limits to which the phase currents are continuously compared. At the start of a conduction interval for one phase (i.e., when a phase is excited for torque production), the switching devices in series with the corresponding phase winding are simultaneously switched on. With both switches thus conductive, current from the DC source builds in the phase winding until the upper limit of the hysteresis band is reached. At that point, both switching devices are turned off. Flyback or return diodes coupled to the phase winding provide a current path back to the DC source. When the phase current decreases to the lower limit of the hysteresis band, the switching devices are switched on again, and the process repeats. This process is commonly referred to as pulse width modulation (PWM) or current chopping. Such a hysteresis band current chopping strategy is described in commonly assigned U.S. Pat. No. 4,739,240, issued to S. R. MacMinn and P. M. Szczesny on Apr. 19, 1988, which is hereby incorporated by reference.

Disadvantageously, high frequency current chopping results in a ripple current component on the DC source bus which must be removed by the DC bus filter capacitor. The size and weight of the filter capacitor are directly proportional to the ripple current rating thereof. Therefore, in order to reduce the volume and weight of a SRM drive, it is desirable to reduce the maximum allowable ripple current. Further, it is desirable to reduce switching losses and hence junction temperatures of the switching devices. In particular, since power is dissipated in a switching device each time the device transitions between a conductive and a nonconductive state, switching losses can be reduced by decreasing the chopping frequency.

Commonly assigned U.S. Pat. No. 4,933,621 of S. R. MacMinn and F. G. Turnbull, issued Jun. 12, 1990, which is incorporated by reference herein, describes a current chopping strategy which overcomes the above enumerated disadvantages of the prior art control strategies for motoring action in a SRM. It is desirable to provide a control strategy which provides the same advantages, i.e., low ripple current and reduced switching losses, for an SRM employed as a generator.

SUMMARY OF THE INVENTION

The present invention provides a new method and apparatus for controlling switching devices and regulating current in a SRM bridge inverter during generating operation, wherein the SRM bridge inverter has at least two switching devices per phase leg connected in series with the corresponding machine phase winding. Each inverter phase leg further includes an upper flyback diode and a lower flyback diode coupled in antiparallel with the series combination of the corresponding switching device and the machine phase winding. At the start of the conduction interval for a particular machine phase, both switching devices of that phase are turned on, causing the phase current to build up. When the phase current reaches an upper hysteresis band level, both switching devices are turned off, resulting in the application of a reverse voltage across the phase winding and directing the phase current into the power source via the flyback diodes. At relatively low and medium speeds, the phase current decreases until it reaches a lower hysteresis band level, at which point only one switching device is turned back on to form a freewheeling loop through that device and the corresponding flyback diode. The process repeats until the turn-off angle of the active phase is reached, at which point both switches are turned off in order to discharge the corresponding phase winding.

In another aspect of the present invention, control circuitry provides for both freewheeling-chopping motoring operation and freewheeling-chopping generating operation.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
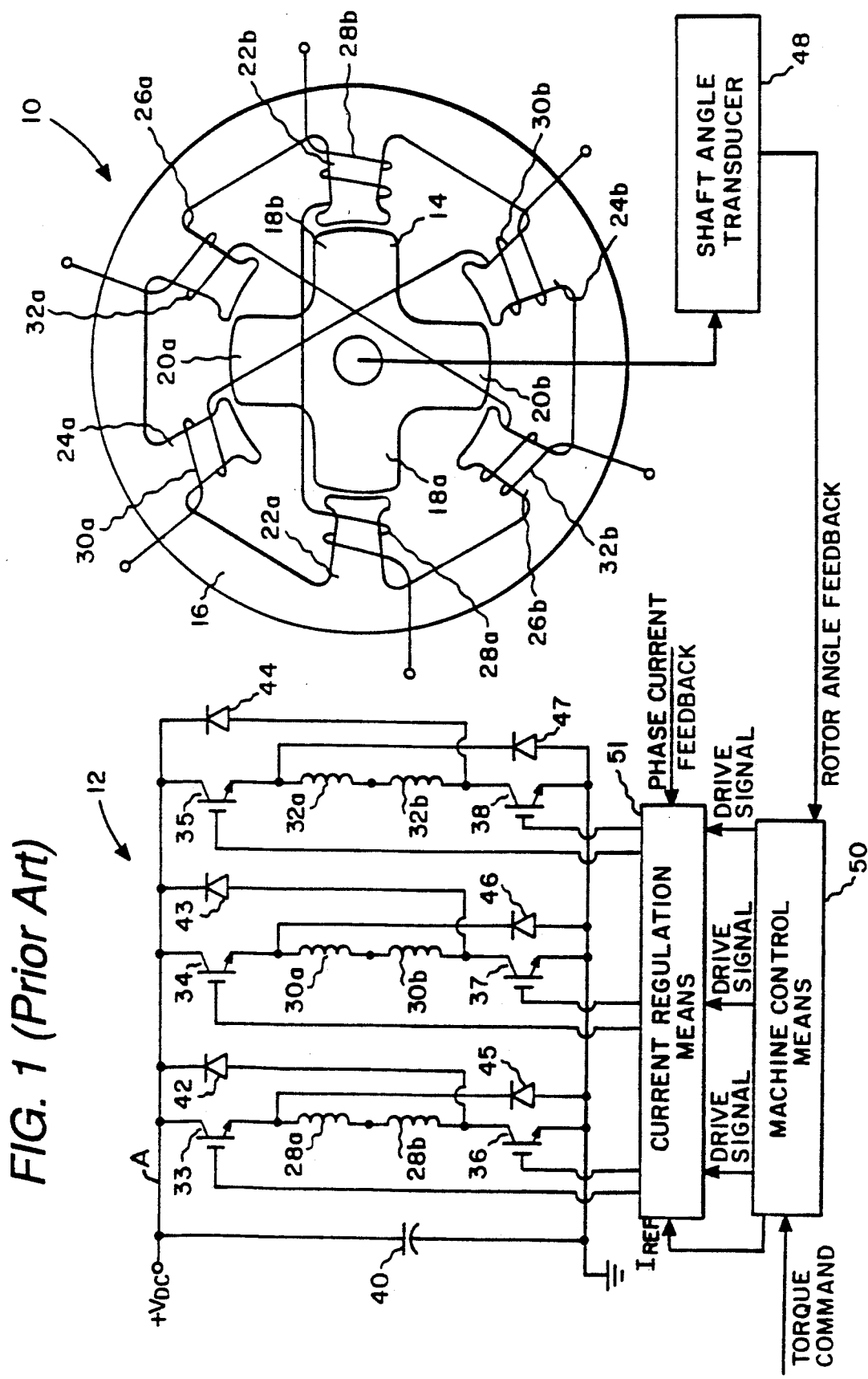
FIG. 1 schematically illustrates a conventional SRM drive.

FIG. 1 shows a conventional switched reluctance machine drive configuration. By way of example, SRM 10 is illustrated as a three-phase machine with its associated power inverter 12. As shown, SRM 10 includes a rotor 14 rotatable in either a forward or reverse direction within a stationary stator 16. Rotor 14 has two pairs of diametrically opposite rotor poles 18a-18b and 20a-20b. Stator 16 has three pairs of diametrically opposite stator poles 22a-22b, 24a-24b and 26a-26b. Stator pole windings 28a-28b, 30a-30b and 32a-32b, respectively, are wound on stator pole pairs 22a-22b, 24a-24b and 26a-26b, respectively. Conventionally, the stator pole windings on each pair of opposing or companion stator pole pairs are connected in series or in parallel to form a machine phase winding. As illustrated in FIG. 1, the stator pole windings comprising each companion pair 28a-28b, 30a-30b and 32a-32b, respectively, are connected in series with each other and with an upper current switching device 33, 34 and 35, respectively, and with a lower current switching device 36, 37 and 38, respectively. The upper and lower switching devices each comprise an insulated gate bipolar transistor (IGT), but other suitable current switching devices may be used; for example, field effect transistors (FETs), gate turn-off thyristors (GTOs) or bipolar junction transistors (BJTs). Each phase winding is further coupled to a DC source, such as a battery or a rectified AC source, by flyback or return diodes 45 and 42, 46 and 43, and 47 and 44, respectively. At the end of each conduction interval of each phase, stored magnetic energy in the respective phase winding is returned, through the respective pair of these diodes connected thereto, to the DC source. Each series combination of a phase winding with two corresponding switching devices and two flyback diodes comprises one phase leg of inverter 12. The inverter phase legs are connected in parallel to each other and are driven by the DC source, which impresses a DC voltage $V_{DC}$ across the parallel inverter phase legs. Capacitance 40 is provided for filtering transient voltages from the DC source and for supplying ripple current to the inverter.

Typically, as shown in FIG. 1, a shaft angle transducer 48, e.g. an encoder or a resolver, is coupled to rotor 14 for providing rotor angle feedback signals to a machine control means 50. An operator command, such as a torque command, is also generally provided to control means 50. Phase current feedback signals are supplied to a current regulation means 51 which receives phase current feedback signals from current sensors (not shown). Suitable current sensors are well-known in the art, such as: Hall effect current sensors; sensing resistors; sensing transformers; and current sensing transistors, such as those sold under the trademark SENSEFET by Motorola Corporation or those sold under the trademark HEXSense by International Rectifier. Additionally, control means 50 provides a commanded reference current waveform IREF to current regulation means 51, to be hereinafter described. In well-known fashion, such as described in U.S. Pat. No. 4,739,240, cited hereinabove, the control means provides firing signals to inverter 12 for energizing the machine phase windings in a predetermined sequence.

As described hereinabove, current regulation in a conventional SRM drive at relatively low and medium speeds is achieved by a hysteresis band current chopping strategy in which current magnitude in each phase is maintained within a hysteresis band of the commanded reference current waveform. Disadvantageously, current chopping by the switching devices results in a ripple current which must be smoothed by the filter capacitor 40. Capacitor size and cost increase with the required ripple current rating.

Figure 2:
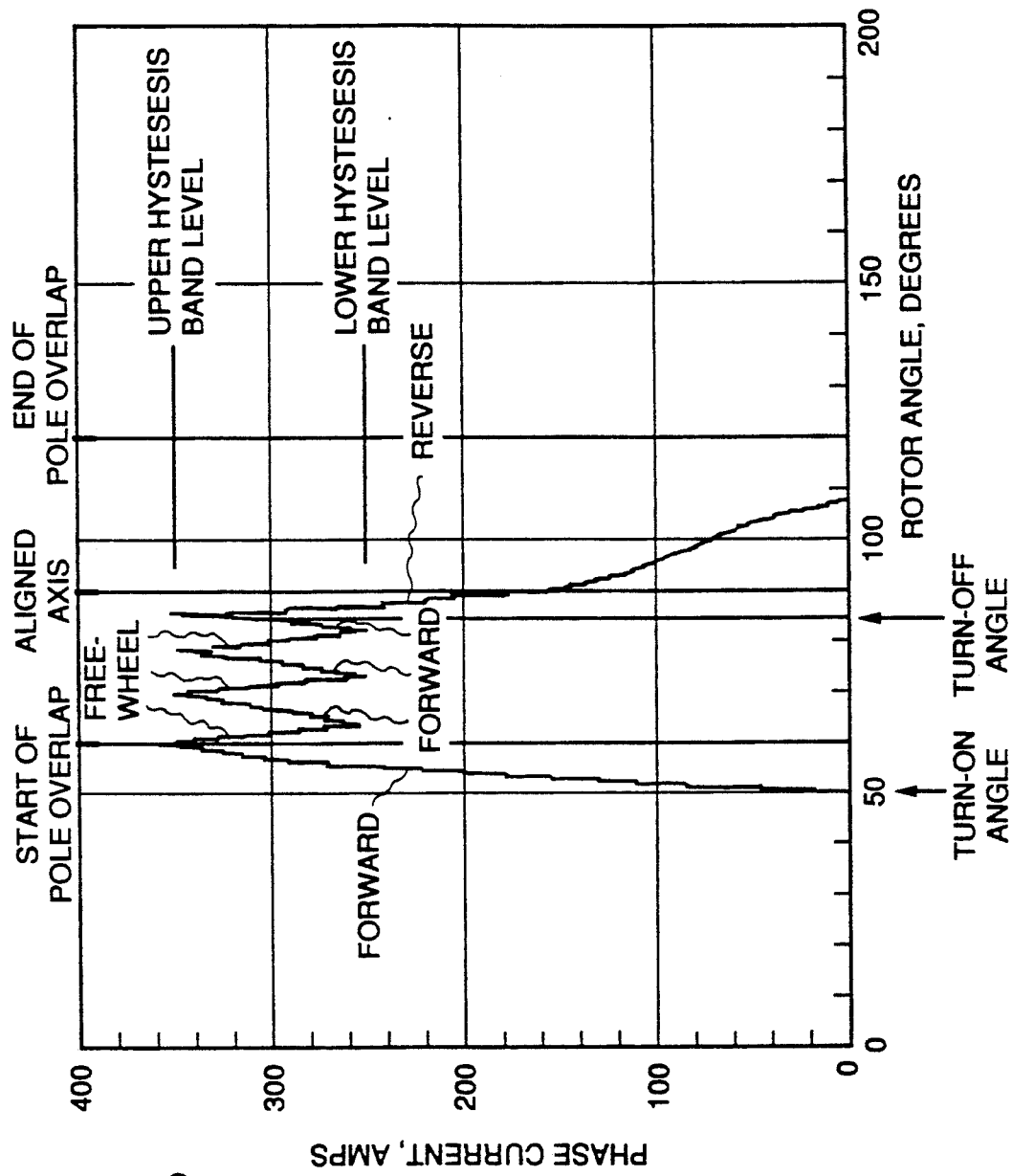
FIG. 2 graphically illustrates a phase current waveform during motoring action using a freewheeling chopping strategy.

FIG. 2 illustrates a phase current waveform for a SRM during motoring action using the current control strategy of MacMinn and Turnbull U.S. Pat. No. 4,933,621, cited hereinabove. In particular, as described in the MacMinn and Turnbull patent, both switching devices of the active phase are turned on at the turn-on angle, i.e., at the start of the conduction interval for that phase. As a result, forward voltage is applied across the corresponding phase winding, causing the phase current to increase. Effective SRM torque production begins approximately at the point where rotor poles of the SRM begin to overlap stator poles of the active phase. A method of hysteresis band current chopping is used to limit the phase current. In particular, when the phase current reaches the upper hysteresis band level, control circuitry acts to turn off one of the switching devices of the active phase. The phase current then circulates in a freewheeling fashion around a loop formed by the other switching device of the active phase and the flyback diode coupled in antiparallel therewith. The phase current decays to the lower hysteresis band level, at which time the control circuitry turns back on the switching device, again putting forward voltage across the phase winding and causing the phase current to build up. The process repeats until the turn-off angle for the active phase is reached. According to U.S. Pat. No. 4,933,621, phase current chopping may be alternated between the two switching devices of each phase; alternatively, only one switching device may be used for phase current chopping, if desired. Advantageously, the SRM freewheeling-chopping motoring control of U.S. Pat. No. 4,933,621 results in a reduced chopping frequency, and hence a lower current ripple, and further results in reduced switching losses.

In accordance with the present invention, a current chopping strategy for generating action in a SRM is provided which also results in a lower chopping frequency and lower switching losses as compared with conventional current regulation schemes. In another aspect of the present invention, a control which combines both current chopping control strategies, i.e., for motoring and generating action, is provided. Furthermore, it is to be understood that although the present invention is described herein with reference to a hysteresis band current regulation scheme, it is to be understood that the principles of the present invention apply equally well to other types of current regulation schemes, such as duty cycle control.

Figure 3:
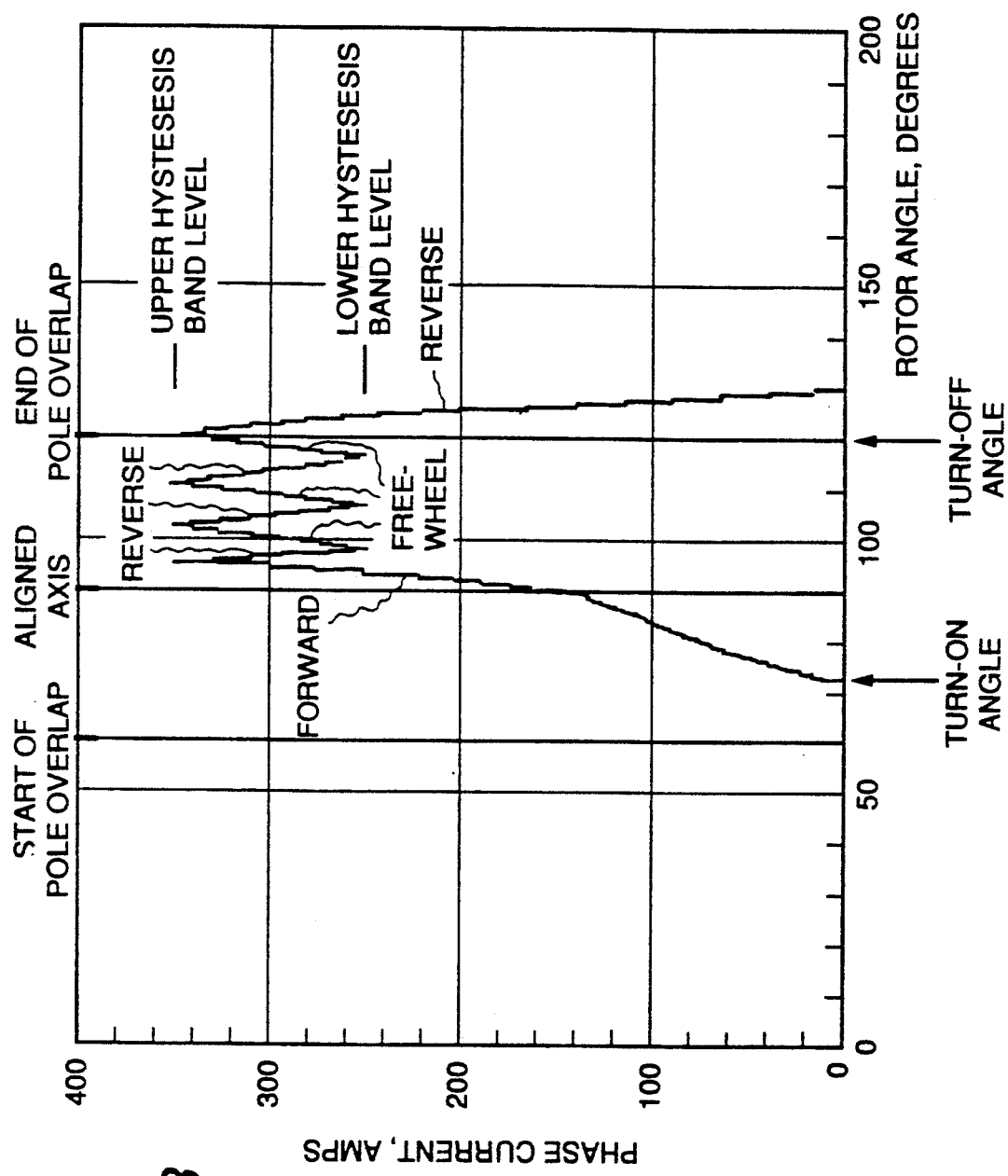
FIG. 3 graphically illustrates a phase current waveform during generating action using a freewheeling chopping strategy according to the present invention.

It has been found that by regulating current in order to produce phase current waveforms during generating action that are approximately mirror images, about the aligned axis, of the phase current waveforms during motoring action results in a lower chopping frequency and lower switching losses than conventional current regulation schemes. As used herein and as illustrated in FIGS. 2 and 3, the aligned axis refers to the rotor angle at the point where rotor poles are aligned with the stator poles of the active phase.

According to the control strategy of the present invention, both switching devices of the active phase (e.g., switching devices 35 and 38) are turned on at the turn-on angle $\theta_{on}$, prior to the aligned axis, forcing the phase current to build up to a sufficiently high value after the rotor passes the aligned axis to produce effective generating torque. When the phase current reaches the upper hysteresis band level, both switching devices 35 and 38 are turned off, resulting in the application of reverse voltage across the phase winding and directing the phase current into the power source $V_{DC}$ via flyback diodes 44 and 47. Energy is thus transferred back to the power source. At relatively low and medium speeds, the phase current decreases until it reaches the lower hysteresis band level, at which point only one switching device (e.g., device 38) is turned back on to form a freewheeling loop through that device and the corresponding flyback diode (e.g., diode 47). The process repeats until the turn-off angle $\theta_{off}$ of the active phase is reached, at which point both switches are turned off in order to discharge the corresponding phase winding (e.g., winding 32a-32b).

Recharging the phase winding using freewheeling chopping according to the present invention is a slower process than recharging the phase winding by applying a forward voltage thereacross by turning on both switching devices as in the conventional method. As a result, during each conduction interval of each phase, there are fewer switching events and hence lower switching losses. As another advantage, the rms current in the DC link is also reduced, reducing losses in DC link capacitor 40 (FIG. 1).

Figure 4:
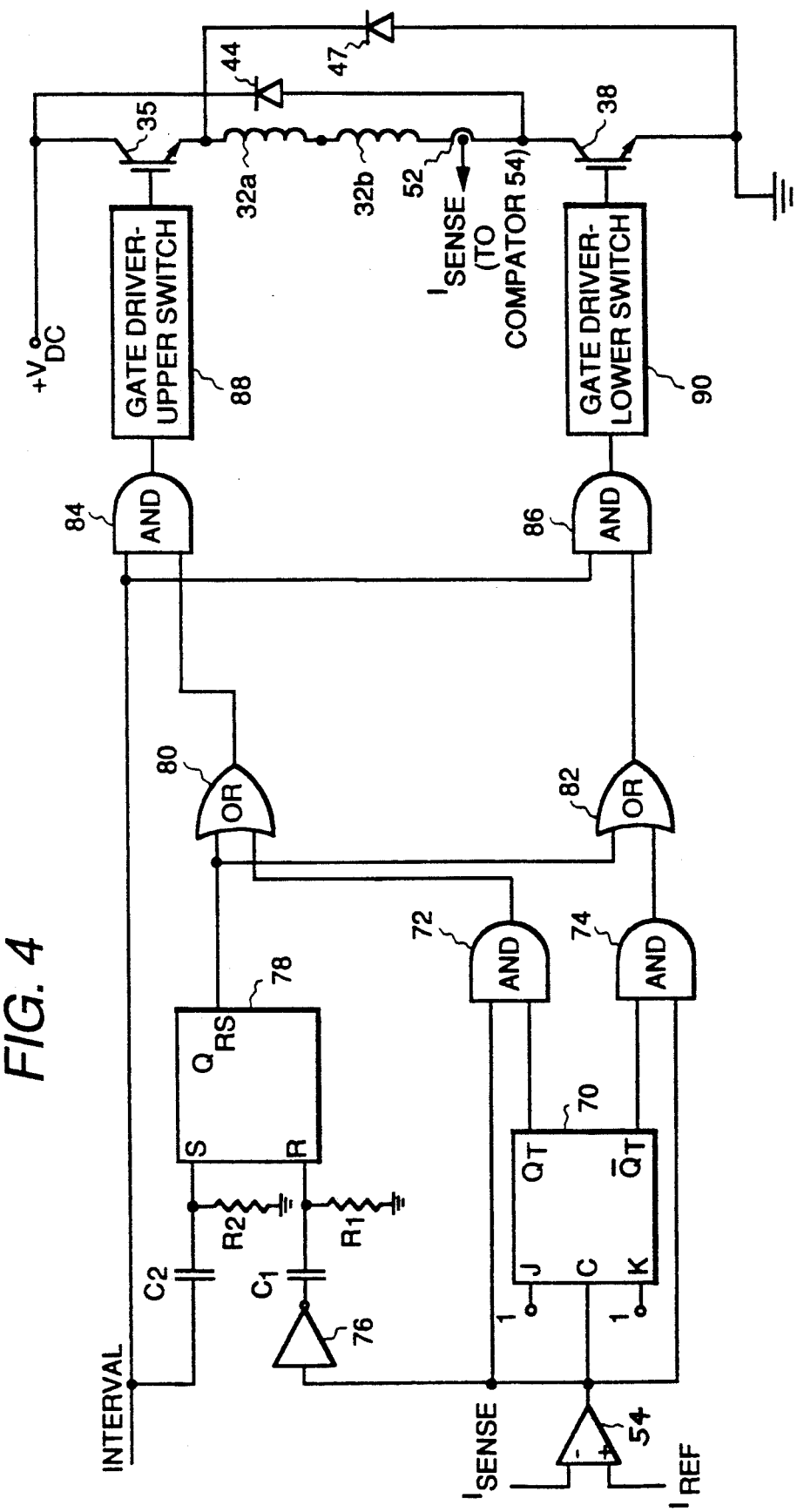
FIG. 4 schematically illustrates a preferred embodiment of a current chopping control for SRM generating action according to the present invention.

FIG. 4 illustrates a preferred embodiment of control circuitry useful in implementing the generating chopping control of the present invention. Since the control circuitry for each phase is identical, FIG. 4 shows that of one phase only. In this regard, operation will be described with reference to one phase only.

As illustrated in FIG. 4, a current sensor 52, such as one of those hereinabove described, is coupled to the phase winding comprising series-connected stator pole windings 32a and 32b. A signal $I_{SENSE}$ proportional to the sensed phase current is produced by current sensor 52 and is supplied to the inverting input of a hysteresis comparator 54, such as an LM311 manufactured by National Semiconductor Corporation. A commanded reference current waveform $I_{REF}$ is generated by a reference waveform generator, such as a function generator (not shown), and is supplied to the noninverting input of comparator 54. The output signal from comparator 54 is logic level one for the phase current charge or recharge states and logic level zero for the phase current discharge state. The output terminal of comparator 54 is coupled to: the clock input C of a toggle flip-flop 70 which changes state at every logic level zero to logic level one transition of the comparator output signal; one input of each of two two-input AND gates 72 and 74; and an inverter 76. The other input to AND gate 72 is provided from the $Q_T$ output of toggle flip-flop 70; and the other input to AND gate 74 is provided from the $\overline{Q_T}$ output of toggle flip-flop 70. The output signal from inverter 76 is provided, via an RC circuit ($R_1$ and $C_1$), to the reset input R of an edge-triggered RS flip-flop 78. An INTERVAL signal is provided, via another RC circuit ($R_2$ and $C_2$), to the set S input of RS flip-flop 78. The INTERVAL signal is logic level one in the range of rotor angles from the turn-on angle $\theta_{on}$ to the turn-off angle $\theta_{off}$ of the respective phase, and is logic level zero otherwise. The output signal $Q_{RS}$ from flip-flop 78 is provided to one input of each of two two-input OR gates 80 and 82. The other input of OR gate 80 is provided from the output of AND gate 72; and the other input of OR gate 82 is provided from AND gate 74. The output signal from OR gate 80 is provided to one input of a two-input AND gate 84; and the output signal from OR gate 82 is provided to one input of a two-input AND gate 86. The other input to each of AND gates 84 and 86 is the INTERVAL signal. The output signal from AND gate 84 is provided to the upper switching device gate driver 88; and the output signal from AND gate 86 is provided to the lower switching device gate driver 90.

In operation, immediately prior to the excitation of the phase including switching devices 35 and 38 (Phase A), the INTERVAL signal is at logic level zero, and the output signal from comparator 54 is at logic level one. At the turn-on angle $\theta_{on}$, the INTERVAL signal transitions to logic level one, setting the output $Q_{RS}$ of edge-triggered flip-flop 78 to logic level one. As a result, the output signals from OR gates 80 and 82 and the output signals from AND gates 84 and 86 become logic level one, causing the gate drivers 88 and 90 to turn on switching devices 35 and 38, respectively. The phase current builds up in phase winding 32a-32b until the current reaches the upper hysteresis band level, at which point the output signal from comparator 54 goes from logic level one to logic level zero. As a result, the signal at the R input of RS flip-flop 78 goes from logic level zero to logic level one, causing the output of flip-flop 78 to reset to logic level zero. Hence, the output signals from all the AND and OR gates are at logic level zero, so that both switching devices 35 and 38 are turned off. The current in phase winding 32a-32b discharges until the lower hysteresis band level is reached. At this point, the output signal from comparator 54 goes back to logic level one, and toggle flip-flop 70 changes state. Hence, the output signal of only one of AND gates 72 or 74 is logic level one, so that the output signals of the corresponding OR gate (80 or 82) and the corresponding AND gate (84 or 86) coupled thereto are also logic level one. On the other hand, the output signal of the other AND gate (72 or 74) is logic level zero, so that the output signals of the OR gate (80 or 82) and the AND gate (84 or 86) coupled thereto are also logic level zero. Hence, only one of the switching devices 35 or 38 is on, and freewheeling-chopping generating action occurs. The process repeats until the turn-off angle $\theta_{on}$ is reached, at which point the INTERVAL signal goes to zero, and the output signals of AND gates 84 and 86 are zero, causing both switching devices 35 and 38 to be turned off to discharge the phase winding 32a-32b.

Figure 5:
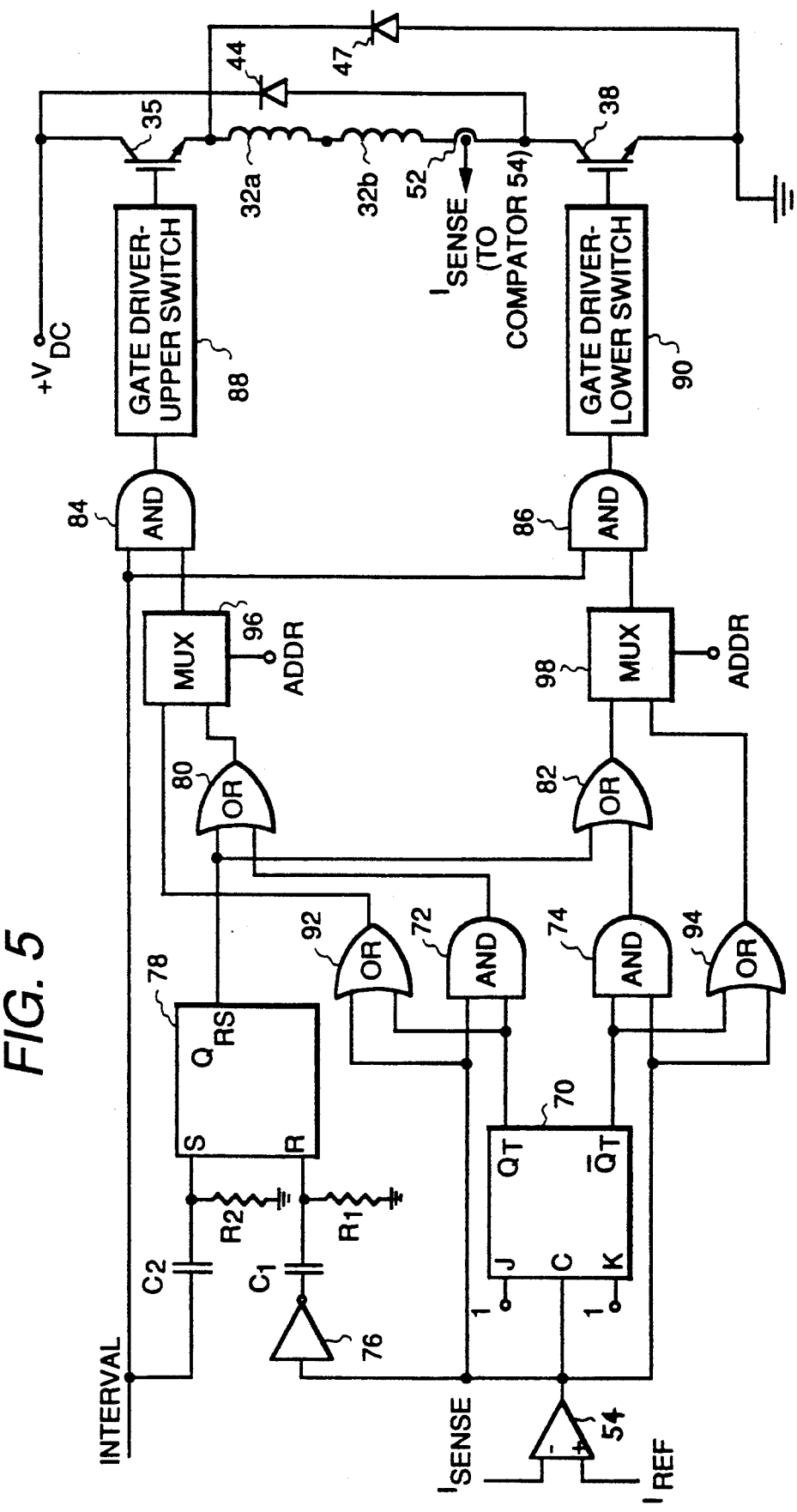
FIG. 5 schematically illustrates a preferred embodiment of a current chopping control for SRM motoring and generating action according to the present invention.

FIG. 5 illustrates control circuitry which combines the freewheeling-chopping motoring strategy of U.S.

Pat. No. 4,933,621 and the freewheeling-chopping generating strategy of the present invention. In particular, the circuit of FIG. 4 is expanded to include two OR gates 92 and 94 and two multiplexers 96 and 98. The input signals to OR gate 92 are the output signal from comparator 54 and the output signal QT from JK flip-flop 70. The output signal from OR gate 92 and the output signal from OR gate 80 are provided to multiplexer 96, the output signal from multiplexer 96 being provided to AND gate 84. Similarly, the input signals to OR gate 94 are the output signal from comparator 54 and the output signal $\overline{Q_T}$ from JK flip-flop 70. The Output signal from OR gate 94 and the output signal from OR gate 82 are provided to multiplexer 98, the output signal from multiplexer 98 being provided to AND gate 86. An address signal ADDR to multiplexers 96 and 98 indicate whether the SRM is operating as a motor or as a generator.

During generating operation, the address signal ADDR to multiplexers 96 and 98 is set to steer the output signal from OR gate 80 to drive the upper switching device 35 and likewise to steer the output signal from OR gate 82 to drive the lower switching device 38, in the manner described in detail hereinabove. On the other hand, during motoring operation, the address signal ADDR to multiplexers 96 and 98 is set to steer the output signal from OR gate 92 to drive the upper switching device 35 and likewise to steer the output signal from OR gate 82 to drive the lower switching device 38, thereby employing the freewheeling-chopping motoring strategy of U.S. Pat. No. 4,933,621. By combining the freewheeling-chopping generating strategy of the present invention with the freewheeling-chopping motoring of U.S. Pat. No. 4,933,621, ripple current and switching losses are reduced for both modes of operation. Furthermore, the rms current in the DC link is lower, reducing the losses in the DC link capacitor.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A control for a bridge inverter for driving a multiphase switched reluctance machine during generating operation, said bridge inverter comprising a plurality of phase legs, each of said phase legs comprising an upper switching device and a lower switching device both connected in series with a machine phase winding of said switched reluctance machine, each of said phase legs further comprising an upper flyback diode coupled in parallel with the series combination of said upper switching device and said machine phase winding and a lower flyback diode coupled in parallel with the series combination of said lower switching device and said machine phase winding, the series combination of said upper and lower switching devices and said machine phase winding being adapted to be connected across an external DC source, said control comprising:

a plurality of current sensing means, each respective one of said current sensing means being coupled to the corresponding inverter phase leg for producing a sense current representative of instantaneous phase current therethrough;

commanded reference waveform generating means for providing a reference current waveform;

a plurality of comparator means, each respective one of said comparator means being coupled to the corresponding current sensing means for comparing the respective sense current with said reference current waveform so as to generate a first logic level signal when the respective sense current exceeds said reference current waveform by a first predetermined amount and a second logic level signal when the respective sense current is less than said reference current waveform by a second predetermined amount;

a plurality of drive means, each respective one of said drive means being coupled to the respective comparator means for turning on said upper and lower switching devices at the start of the conduction interval of the respective phase and for turning off said upper and lower switching devices in response to the first occurrence of said first logic level signal during each respective conduction interval, each respective one of said drive means thereafter during each respective conduction interval turning on a preselected one of said switching devices in response to said second logic level signal and turning off said preselected one of said switching devices in response to said first logic level signal, both of said switching devices being turned off at the end of the respective conduction interval.

2. The control of claim 1 wherein each of said drive means comprises:

first flip-flop circuit means for receiving the output signal from said comparator means and generating a logic level signal for turning on both of said switching devices at the start of the conduction interval of the respective phase and for turning off both of said switching devices in response to the first occurrence of said first logic level signal during each respective conduction interval; and second flip-flop circuit means for receiving the output signal from said comparator means and generating a logic level signal for alternately turning on and off said preselected one of said switching devices until the end of each respective conduction interval.

3. A control for a bridge inverter for driving a multiphase switched reluctance machine during generating operation, said bridge inverter comprising a plurality of phase legs, each of said phase legs comprising an upper switching device and a lower switching device both connected in series with a machine phase winding of said switched reluctance machine, each of said phase legs further comprising an upper flyback diode coupled in parallel with the series combination of said upper switching device and said machine phase winding and a lower flyback diode coupled in parallel with the series combination of said lower switching device and said machine phase winding, the series combination of said upper and lower switching devices and said machine phase winding being adapted to be connected across an external DC source, said control comprising:

a plurality of current sensing means, each respective one of said current sensing means being coupled to the corresponding inverter phase leg for producing a sense current representative of instantaneous phase current therethrough;

commanded reference waveform generating means for providing a reference current waveform;

a plurality of comparator means, each respective one of said comparator means being coupled to the corresponding current sensing means for comparing the respective sense current with said reference current waveform so as to generate a first logic level signal when the respective sense current exceeds said reference current waveform by a first predetermined amount and a second logic level signal when the respective sense current is less than said reference current waveform by a second predetermined amount;

a plurality of drive means, each respective one of said drive means being coupled to the respective comparator means for turning on said upper and lower switching devices at the start of the conduction interval of the respective phase and for turning off said upper and lower switching devices in response to the first occurrence of said first logic level signal during each respective conduction interval, each respective one of said drive means thereafter during each respective conduction interval alternately turning on first and second preselected ones of said switching devices in response to said second logic level signal, while the other of said switching devices remains off, and then turning off both said first and second preselected ones of said switching devices in response to said first logic level signal, both of said switching devices being turned off at the end of the respective conduction interval.

4. The control of claim 3 wherein each of said drive means comprises:

first flip-flop circuit means for receiving the output signal from said comparator means and generating a logic level signal for turning on both of said switching devices at the start of the conduction interval of the respective phase and for turning off both of said switching devices in response to the first occurrence of said first logic level signal during each respective conduction interval; and second flip-flop circuit means for receiving the output signal from said comparator means and generating a logic level signal for alternately turning on and off said first and second preselected ones of said switching devices until the end of each respective conduction interval.

5. A control for a bridge inverter for driving a multiphase switched reluctance machine during motoring and generating modes of operation, said bridge inverter comprising a plurality of phase legs, each of said phase legs comprising an upper switching device and a lower switching device both connected in series with a machine phase winding of said switched reluctance machine, each of said phase legs further comprising an upper flyback diode coupled in parallel with the series combination of said upper switching device and said machine phase winding and a lower flyback diode coupled in parallel with the series combination of said lower switching device and said machine phase winding, the series combination of said upper and lower switching devices and said machine phase winding being adapted to be connected across an external DC source, said control comprising:

a plurality of current sensing means, each respective one of said current sensing means being coupled to the corresponding inverter phase leg for producing a sense current representative of instantaneous phase current therethrough;

commanded reference waveform generating means for providing a reference current waveform;

a plurality of comparator means, each respective one of said comparator means being coupled to the corresponding current sensing means for comparing the respective sense current with said reference current waveform so as to generate a first logic level signal when the respective sense current exceeds said reference current waveform by a first predetermined amount and a second logic level signal when the respective sense current is less than said reference current waveform by a second predetermined amount;

a plurality of drive means, each respective one of said drive means being coupled to the respective comparator means for driving said upper and lower switching devices in the motoring and generating modes of operation;

multiplexing means for determining whether said switching devices operate in the motoring or generating mode of operation;

each respective one of said drive means, during the generating mode, turning on said upper and lower switching devices the start of the conduction interval of the respective phase and turning off said upper and lower switching devices in response to the first occurrence of said first logic level signal during each respective conduction interval, each respective one of said drive means thereafter during each respective conduction interval turning on a preselected one of said switching devices in response to said second logic level signal and turning off said preselected one of said switching devices in response to said first logic level signal, both of said switching devices being turned off at the end of the respective conduction interval;

each respective one of said drive means, during the motoring mode, turning on said upper and lower switching devices at the start of the conduction interval of the respective phase and turning off a preselected one of said switching devices in response to said first logic level signal so as to allow the respective phase current to circulate through the respective machine phase winding while said preselected one of said switching devices is nonconductive, said drive means turning back on said preselected one of said switching devices in response to said second logic level signal, both of said switching devices being turned off at the end of the respective conduction interval.

6. A control for a bridge inverter for driving a multiphase switched reluctance machine during motoring and generating modes of operation, said bridge inverter comprising a plurality of phase legs, each of said phase legs comprising an upper switching device and a lower switching device both connected in series with a machine phase winding of said switched reluctance machine, each of said phase legs further comprising an upper flyback diode coupled in parallel with the series combination of said upper switching device and said machine phase winding and a lower flyback diode coupled in parallel with the series combination of said lower switching device and said machine phase winding, the series combination of said upper and lower switching devices and said machine phase winding being adapted to be connected across an external DC source, said control comprising:

a plurality of current sensing means, each respective one of said current sensing means being coupled to the corresponding inverter phase leg for producing a sense current representative of instantaneous phase current therethrough;

commanded reference waveform generating means for providing a reference current waveform;

a plurality of comparator means, each respective one of said comparator means being coupled to the corresponding current sensing means for comparing the respective sense current with said reference current waveform so as to generate a first logic level signal when the respective sense current exceeds said reference current waveform by a first predetermined amount and a second logic level signal when the respective sense current is less than said reference current waveform by a second predetermined amount;

a plurality of drive means, each respective one of said drive means being coupled to the respective comparator means for driving said upper and lower switching devices in the motoring and generating modes of operation;

multiplexing means for determining whether said switching devices operate in the motoring or generating mode of operation;

each respective one of said drive means, during the generating mode, turning on said upper and lower switching devices at the start of the conduction interval of the respective phase and turning off said upper and lower switching devices in response to the first occurrence of said first logic level signal during each respective conduction interval, each respective one of said drive means thereafter during each respective conduction interval alternately turning on first and second preselected ones of said switching devices in response to said second logic level signal, while the other one of said switching devices remains off, and then turning off both said first and second preselected ones of said switching devices in response to said first logic level signal, both of said switching devices being turned off at the end of the respective conduction interval;

each respective one of said drive means, during the motoring mode, turning on said upper and lower switching devices at the start of the conduction interval of the respective phase and thereafter alternately turning off first and second preselected ones of said switching devices in response to said first logic level signal so as to allow the respective phase current to circulate through the respective machine phase winding while the other one of said preselected one of said switching devices is nonconductive, both said first and second preselected ones of said switching devices being turned on in response to said second logic level signal, and both of said switching devices being turned off at the end of the respective conduction interval.

7. A method for controlling a bridge inverter for driving a multiphase switched reluctance machine, said inverter comprising a plurality of phase legs, each of said phase legs comprising an upper switching device and a lower switching device both connected in series with a machine phase winding of said switched reluctance machine, each of said phase legs further comprising an upper flyback diode coupled in parallel with the series combination of said upper switching device and said machine phase winding and a lower flyback diode coupled in parallel with the series combination of said lower switching device and said machine phase winding, the series combination of said upper and lower switching devices and said machine phase winding being adapted to be connected across an external DC source, said method comprising the steps of:

(a) sensing instantaneous phase current in each respective phase leg of said inverter;

(b) comparing a proportional representation of the respective phase current to a reference current waveform;

(c) turning on said upper and lower switching devices of the corresponding phase when the proportional representation of the respective phase current is less than said reference current waveform by a first predetermined amount;

(d) repeating steps (a) and (b);

(e) turning off said upper and lower switching devices when the proportional representation of the respective phase current exceeds said reference current waveform by a second predetermined amount;

(f) repeating steps (a) and (b);

(g) turning back on a first preselected one of said switching devices when the proportional representation of the respective phase current is less than said reference current waveform by said first predetermined amount;

(h) repeating steps (a) and (b);

(i) turning off said first preselected one of said switching devices when the proportional representation of the respective phase current exceeds said reference current waveform by said first predetermined amount; and (j) repeating steps (f) through (i) of said method continuously during the conduction interval of each respective phase.

8. A method for controlling a bridge inverter for driving a multiphase switched reluctance machine during generating operation, said inverter comprising a plurality of phase legs, each of said phase legs comprising an upper switching device and a lower switching device both connected in series with a machine phase winding at said switched reluctance machine, each of said phase legs further comprising an upper flyback diode coupled in parallel with the series combination of said upper switching device and said machine phase winding and a lower flyback diode coupled in parallel with the series combination of said lower switching devices and said machine phase winding, the series combination of said upper and lower switching devices and said machine phase winding being adapted to be connected across an external DC source, said method comprising the steps of:

(a) sensing instantaneous phase current in each respective phase leg of said inverter;

(b) comparing a proportional representation of the the respective phase current to a reference current waveform;

(c) turning on said upper and lower switching devices of the corresponding phase when the proportional representation of the respective phase current is less than said reference current waveform by a first predetermined amount;

(d) repeating steps (a) and (b);

(e) turning off said first and second switching devices when the proportional representation of the respective phase current exceeds said reference current waveform by a second predetermined amount;
(f) repeating steps (a) and (b);
(g) turning on a first preselected one of said switching devices when the proportional representation of the respective phase current is less than said reference current waveform by said first predetermined amount;
(h) repeating steps (a) and (b);
(i) turning off said first preselected one of said switching devices when the proportional representation of the respective phase current exceeds said reference current waveform by said second predetermined amount;
(j) repeating steps (a) and (b);
(k) turning on a second preselected one of said switching devices when the proportional representation of the respective phase current is less than said reference current waveform by said first predetermined amount;
(l) repeating steps (a) and (b);
(m) turning off said second preselected one of said switching devices when the proportional representation of the respective phase current exceeds said reference current waveform by said second predetermined amount;
(n) repeating steps (f) through (m) of said method continuously during the conduction interval of each respective phase.

* * * * *